United States Patent
Ikehara et al.

(10) Patent No.: US 7,245,218 B2
(45) Date of Patent: Jul. 17, 2007

(54) INPUT DEVICE TO CONTINUOUSLY DETECT BIOMETRICS

(76) Inventors: Curtis Satoru Ikehara, 99-603 Kaulainahee Pl., Aiea, HI (US) 96701; Martha Elizabeth Crosby, 1379 Kehaulani Dr., Kailua, HI (US) 96734

( * ) Notice: Subject to any disclaimer, the term of this patent is extended or adjusted under 35 U.S.C. 154(b) by 511 days.

(21) Appl. No.: 10/660,542

(22) Filed: Sep. 12, 2003

(65) Prior Publication Data
US 2005/0057339 A1    Mar. 17, 2005

(51) Int. Cl.
*H04Q 9/00* (2006.01)
*G06K 9/00* (2006.01)

(52) U.S. Cl. ............ 340/552; 340/5.53; 340/5.82; 340/5.83; 382/116

(58) Field of Classification Search ........... 340/5.52, 340/5.53, 5.82, 5.83; 382/116; 902/3; 713/382
See application file for complete search history.

(56) References Cited

U.S. PATENT DOCUMENTS

| | | | |
|---|---|---|---|
| 5,229,764 A * | 7/1993 | Matchett et al. | 340/5.52 |
| 5,991,431 A * | 11/1999 | Borza et al. | 382/127 |
| 6,487,662 B1 * | 11/2002 | Kharon et al. | 713/186 |
| 6,898,299 B1 * | 5/2005 | Brooks | 382/115 |
| 6,914,517 B2 * | 7/2005 | Kinsella | 340/5.83 |
| 2002/0073340 A1 * | 6/2002 | Mambakkam et al. | 713/202 |

* cited by examiner

*Primary Examiner*—Jeffery Hofsass
*Assistant Examiner*—Scott Au (57) ABSTRACT

A method and system for correlating control surface finger pressures to identifying biometric characteristics of a user from a computer input device, such as a mouse. Pressure sensors attached to a computer mouse sense the biometric characteristics, which are correlated to identifying biometric characteristics using a correlation model. The correlation model is derived from a registration process in which a baseline biometric attribute-to-identity correlation is rendered based on statistical analysis of registration signals generated by users. During routine use, the correlation model is use to continuously authenticate the identity of the user from surface finger pressures on the computer mouse.

13 Claims, 9 Drawing Sheets

INPUT DEVICE TO CONTINUOUSLY DETECT BIOMETRICS

BACKGROUND OF THE INVENTION

1. Field of the Invention

The present invention relates to biometric devices used to identify people and, more particularly, to a biometric device that can continuously authenticate every input the user makes using the device based on a correlational analysis of sensor signals from the device.

2. Description of Prior Art

Unauthorized data entry and computer operation is a major computer security problem that yearly costs in the millions of dollars of damage and millions of person-hours to correct. Authenticating the identity of an authorized computer user is a necessary part of computer use. Insuring that a person is authorized to use a computer can be done in three different ways. The first method is by the use of something a person carries, such as a token, key or smart card (e.g., U.S. Pat. Nos. 6,247,644 & 6,268,788). The second method is by the use of something a person knows, such as a password or personal identification code. The third method is by the use of a person's unique physical or behavioral attributes. A physical attribute would be like a finger print or facial feature. A behavioral attribute might be the way a person moves or speaks, such as a person's gait when walking or speech patterns. This third method of using physical or behavioral attributes of the person is called biometrics. Most computer security systems use one or more methods to authenticate the user's identity, but biometrics is the most resistant to theft, since it is part of a person's attributes.

Biometric devices that measure fingerprints (e.g., U.S. Pat. No. 6,125,192), voice (e.g., U.S. Pat. No. 5,913,196), irises (e.g., U.S. Pat. No. 6,554,705), and facial images (e.g., U.S. Pat. No. 6,554,705) are available. All biometric devices require initial registration of the user's attribute that are measured by the sensors of the biometric device. Upon initial use to authenticate the identity of the user, current biometric devices extract a feature set from sensors which are correlated to an existing user database acquired during user registration. These devices require training, are time consuming, can be difficult to use, can require extra equipment, can be expensive and are so inconvenient that user identity authentication is done only upon initial use.

Handheld writing devices that use pressure as a biometric is possible (e.g., U.S. Pat. Nos. 5,774,571, 6,539,101), but they are not commonly used as input devices to a computer and is not commonly available. Also, these devices are primarily for one time identification applications.

There are some devices designed to authenticate a computer user that are built into a computer mouse to identify the computer user such as by using a thumb or index fingerprint (e.g., U.S. Pat. Nos. 5,991,431 & D440,568). These devices reduce the cumbersome nature of a separate piece of equipment for identification, but these devices are designed primarily to provide authentication upon initial use and require training on the placement of the finger. Another problem with many of the previously described biometric devices is that they rely primarily on the signal from a single sensor. A sensor flaw or signal distortion from that sensor would reduce the reliability of the user identity authentication system.

There are devices similar to the invention with different stipulated uses for the signals from sensor on a computer mouse. Both U.S. Pat. No. 6,190,314 (i.e., A "Computer Input Device with Biosensors for Sensing User Emotions") and a paper by Qi and Picard (Qi, Y. and Picard, R. W., "Context-sensitive Bayesian Classifiers and Application to Mouse Pressure Pattern Classification", Proceedings of the International Conference on Pattern Recognition, August 2002, Quéébec City, Canada) stipulate the use of sensors on a computer mouse to detect emotions. Neither stipulate the use of the sensor signals for identification or continuous authentication of the user.

Continuous authentication of the identity of a computer user is one of the best ways to use biometrics to prevent unauthorized use of a computer system. An example of continuous authentication is a guard constantly watching who is using a computer, using facial features as the unique biometric identifying attribute. Continuous authentication can prevent an unauthorized person from slipping in and using the computer system after the initial authentication of the identity of the authorized user.

The invention senses the pressures a user applies to the computer mouse during routine use. The sensors for the invention are incorporated into the structure of a computer mouse. After the initial registration of the user, there is no training and no special finger placement required, the user simply uses the computer mouse. Authentication of the user can occur within a few clicks and can be continuous as long as the user provides input to the computer with the mouse. Multiple sensors within the mouse provide a unique multi-dimensional measure of the user's attributes. The invention resolves the shortcomings of previous inventions by: not requiring training, having a brief period for initial registration of the user's identity, being easy to use, not requiring extra equipment, using multiple pressure sensors located at critical stress points and providing continuous authentication of the user's identity.

OBJECTS AND ADVANTAGES

It is therefore an object of the invention to analyze the signals produced by multiple pressure sensors to authenticate the identity of the user.

It is another object of the invention to continuously authenticate the identity of the user of the invention.

It is another object of the invention to have multiple sensors on the invention to eliminate the dependency on a single sensor.

It is another object of the invention to eliminate the need for training or the use of special procedures for identity authentication.

It is another object of the invention to provide rapid identity authentication.

BRIEF SUMMARY OF THE INVENTION

In accordance with the present invention, there is provided a computer input device with multiple pressure sensors. A possible embodiment of the computer input device would be a computer mouse with sensors placed on the base and on the lever of each of two finger push buttons. A method for correlating pressures applied to a computer input device and authenticating the identity of the user. The method includes a procedure for initially registering the unique pressure attributes of the computer user on the device using one or more pressure sensors. Also, the method includes using the pressure attributes collected during registration to at least one correlational model. The correlational model is used to authenticate the identity of the user.

BRIEF DESCRIPTION OF THE SEVERAL VIEWS OF THE DRAWING

A complete understanding of the present invention may be obtained by reference to the accompanying drawings, when considered in conjunction with the subsequent, detailed description, in which.

For purposes of clarity and brevity, like elements and components will bear the same designations and numbering throughout the FIGURES.

DETAILED DESCRIPTION OF THE INVENTION

Figure 1:
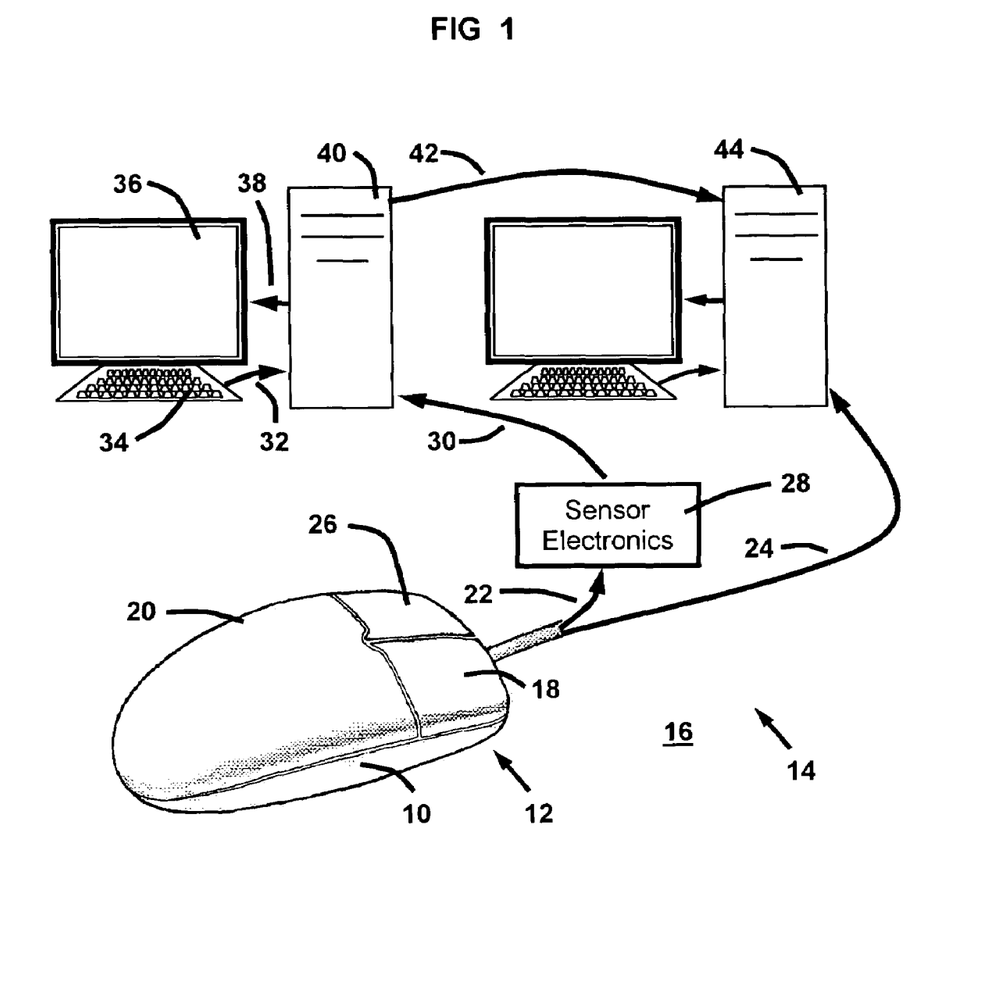
FIG. 1 is a schematic diagram view of a system for correlating physiological attributes of a computer user to the identity of the user.

Referring initially to FIG. 1, a schematic diagram is shown, generally designated the system 14, that includes two computer systems which are the authentication computer 40 and task computer 44. The task computer 44 consists of one or more input devices, such as a computer mouse 12 and a keyboard 34, to input data to the task computer 44 via mouse to computer cable 24 and keyboard to computer cable 32. The authentication computer 40 consists of one or more input devices, such as a keyboard 34, to input data to the authentication computer 40 via keyboard to computer cable 32. The authentication computer 40 also consists of a sensor electronics module 28 that receives conditions and amplifies signals from a plurality of pressure sensors in the computer mouse 12 via the mouse to electronics cable 22. The conditioned signal from the sensor electronics module 28 is sent to the authentication computer 40 via the electronics to computer cable 30. The authentication computer 40 is connected to the task computer 44 via the authentication to task computer cable 42.

The authentication computer 40 and task computer 44 can output data to one or more output devices such as a video monitor 36 via a computer to monitor cable 38. The system 14 with computers, input devices and output devices are supported on a surface 16.

The authentication computer 40 and task computer 44 of the present invention can be a desktop computer, laptop computer, hand-held palm organizer or custom designed computer. The functions of the authentication computer 40 and task computer 44 can be incorporated into a single computer or functional modules can be distributed to many computers. Output devices other than those shown can be used. Input devices other than those shown can be used.

The authentication computer 40 and task computer 44 can output data to a data storage device, a printer, or a computer-network. Communication between computers in the system 14 can be via electric cords or wireless technology.

In the particular embodiment shown, in addition to the normal input functions of a mouse, the computer mouse 12 includes one or more input surfaces with pressure sensors to detect pressure signals when the user manipulates the computer mouse 12. These signals from the pressure sensors, via the mouse to electronics cable 22 provide input to the sensor electronics module 28 that conditions and converts the analog signal to a digital signal. The digital signal via the electronics to computer cable 30 is sent to the authentication computer 40 for analysis. An example would be a computer mouse 12 with a pressure sensor structurally attached to the left mouse button 54 assembly to detect the pressure applied to a left push button 48 as it is depressed. This signal is conditioned and converted by the sensor electronics module 28 and sent to the authentication computer 40 via electronics to computer cable 30 for analysis.

In accordance with the present invention, the computer mouse 12 includes a plurality of pressure sensors to sense the pressure the user applies to the computer mouse 12 when the user manipulates the input surfaces of the computer mouse 12 such as the left button cover 26, right button cover 18 upper mouse case 20 and lower mouse case 10. As disclosed in greater detail below, the pressure sensors generate signals that represent respective physiological attributes of the user. It is to be understood that if desired, other input devices, such as the keyboard 34, joystick, steering wheel and track ball can include the pressure sensors of the present invention.

Figure 2:
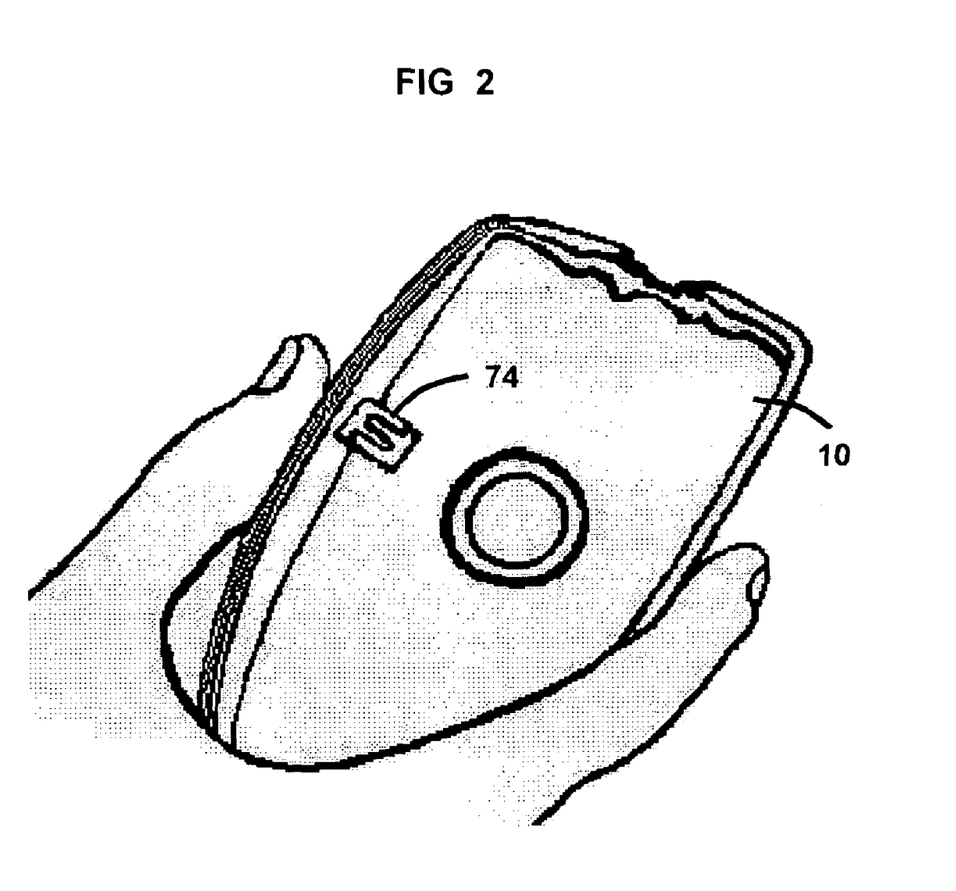
FIG. 2 is a perspective top view of a bottom half computer mouse case showing the internal placement of the bottom case pressure sensor.

FIG. 2 shows the preferred embodiment for detecting pressure on the lower mouse case 10. A pressure sensor is positioned on the inside of the lower mouse case 10 where the thumb of a right-handed user would normally rest. In this embodiment, the lower mouse pressure sensor is a resistive strain gauge made by Measurements Groups Incorporated of North Carolina, mounted at a location in the lower mouse case 10. Alternately, other types of sensors based on the following property changes can be used to measure pressure. These property changes include but are not limited to: capacitive, conductive, displacement, electromagnetic, electromechanical, electrochemical, inductive, magnetic, optical, and piezoelectric. When the user squeezes the lower mouse case 10, the deflection of the material of the lower mouse case 10 measured by the strain gauge reflects the pressure applied by the user to the lower mouse case 10.

Figure 3:
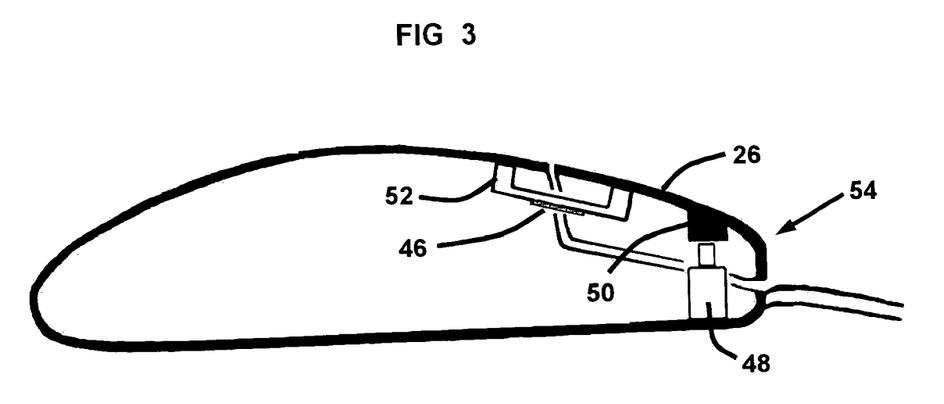
FIG. 3 is a cross sectional side view of a computer mouse showing the button cover, button cover support structure, button cover post and push button when the computer mouse button is not depressed.
Figure 4:
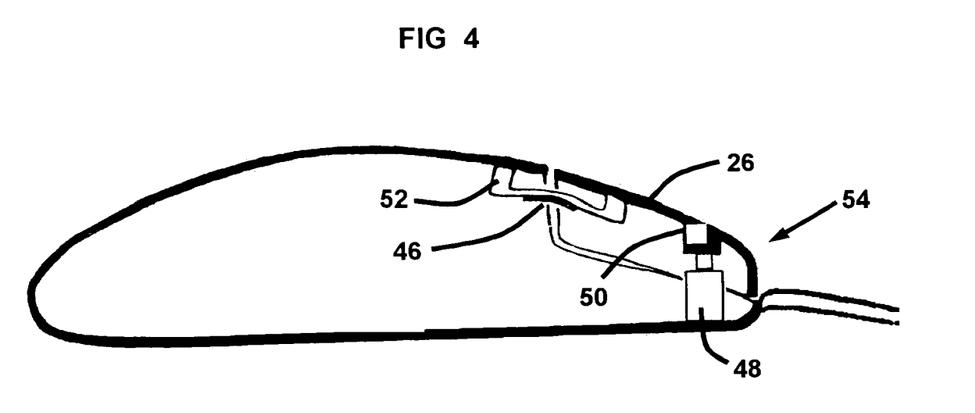
FIG. 4 is a cross sectional side view of a computer mouse showing the button cover, button cover support structure, button cover post and push button when the computer mouse button is depressed.

FIG. 3 shows the preferred embodiment for detecting pressure applied by the user on the left mouse button 54. The figure shows a cross sectional side view of a computer mouse 12 when the left mouse button 54 is not depressed, the left mouse button 54 assembly includes the left button cover 26, left suspension structure 52, left button pressure sensor, left post 50 and left push button 48. The left suspension structure 52 holds the left button cover 26 such that the left post 50 is above the left push button 48. A pressure sensor is mounted on the left suspension structure 52. FIG. 4 shows a cross sectional side view of a computer mouse 12 when the left mouse button 54 is depressed. When the left mouse button 54 is depressed, pressure on the left button cover 26 causes the left suspension structure 52 to deflect, the left button pressure sensor signal changes in correspondence to the amount of pressure the user is applying to the left mouse button 54.

The pressure on the right mouse button is detected in the same way as the left mouse button 54. The right mouse button assembly is constructed of a right suspension structure that holds the right button cover 18 such that the right post is above the right push button. A pressure sensor is mounted on the right suspension structure. When the right mouse button is depressed, pressure on the right button cover 18 causes the right suspension structure to deflect, the right button pressure sensor signal changes in correspondence with the amount of pressure the user is applying to the right mouse button.

Figure 5:
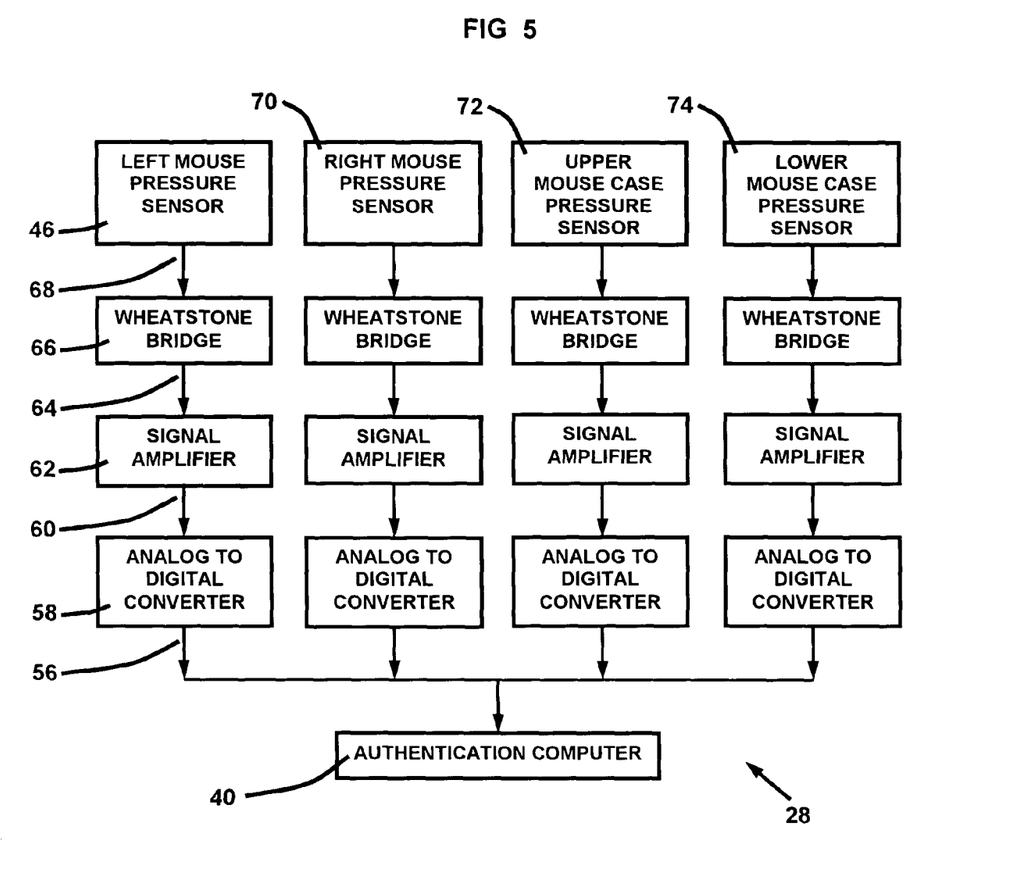
FIG. 5 is a schematic diagram view of a set of sensor input to the system.
Figure 6:
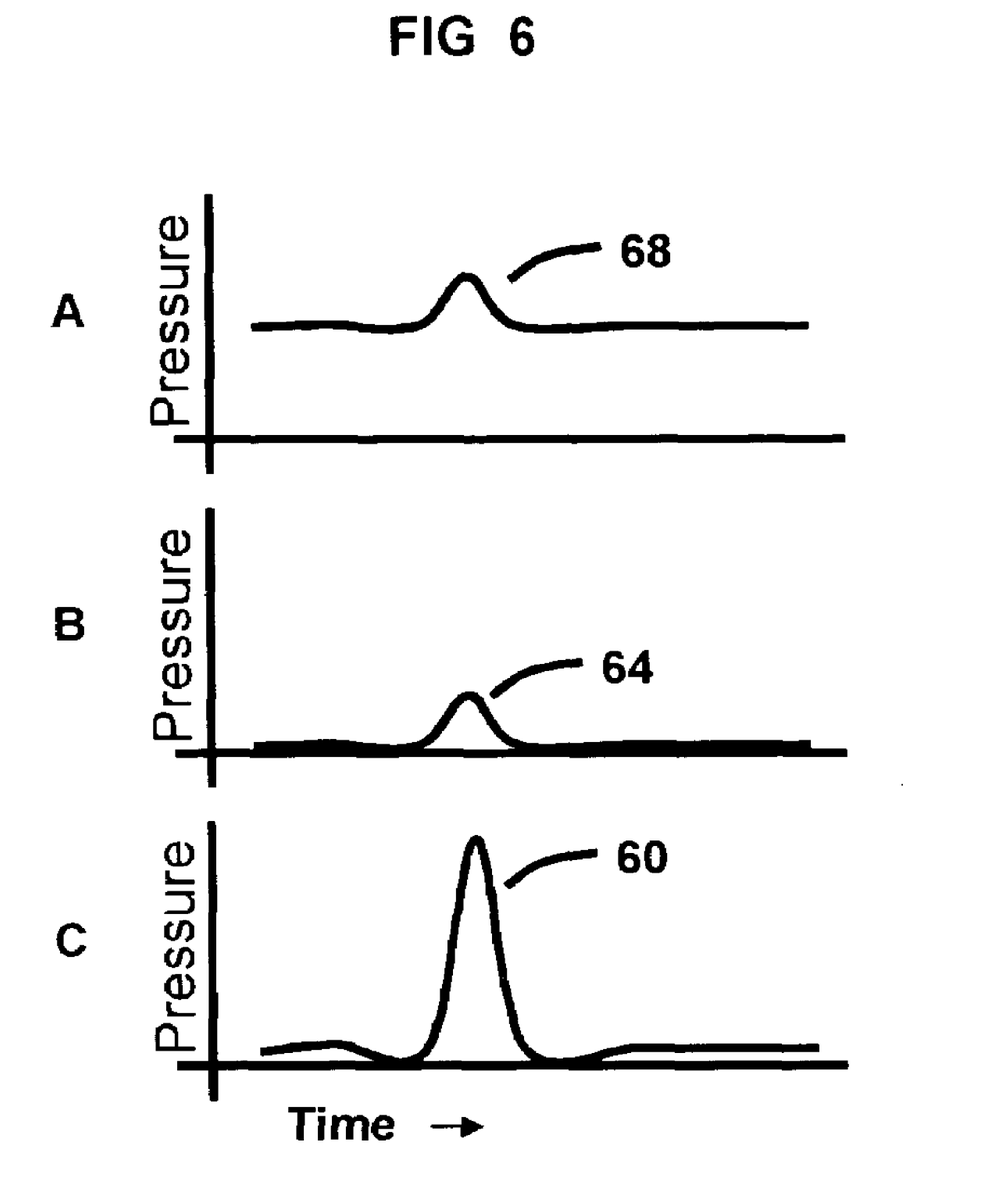
FIG. 6 is a graphic view of a pressure sensor signal as it changes through the stages.

FIG. 5 shows a diagram of the sensor electronics module 28 detailing the preferred embodiment of the device hardware. The diagram shows a plurality of pressure sensor inputs which are the left mouse pressure sensor 46, right mouse pressure sensor 70, upper case pressure sensor, and the lower mouse case pressure sensor 74. When a user applies pressure to the computer mouse 12 a pressure wave is created. As an example, FIG. 6 shows a graph of a pressure wave signal 68 from a single pressure sensor as it changes through the components of the sensor electronics module 28. In FIG. 6, Graph A shows the pressure wave signal 68, Graph B shows the minimum of the pressure wave signal offset 64 to zero by the Wheatstone bridge 66 and Graph C shows the pressure wave signal amplified 60 by the signal amplifier 62 to maximize the dynamic range before the signal is converted by the analog to digital converter 58. The resulting digital signal from the analog to digital converter 58 is analyzed in the authentication computer 40.

Continuous authentication of the user of the task computer 44 is performed by the authentication computer 40 using two modules. The first module is the registration module 76 and the second is the continuous authentication module 92 shown in FIGS. 7 and 9 respectively.

In accordance with the present invention, the authentication computer 40 accesses the registration module 76 and continuous authentication module 92 that can be executed by the authentication computer 40 to undertake the inventive logic disclosed below in detail. It is to be understood that the control modules such as the registration module 76 and continuous authentication module 92 are executed by logic components such as are embodied in logic circuits or in software contained in an appropriate electronic data storage, e.g., computer memory, a hard disk drive and/or optical disk drive, that are conventionally coupled to the authentication computer 40.

The flow charts herein illustrate the structure of the registration module 76 and continuous authentication module 92 of the present invention as embodied in computer program software. Those skilled in the art will appreciate that the flow charts illustrate the structures of logic elements, such as computer program code elements or electronic logic circuits that function according to this invention. Manifestly, the invention is practiced in its essential embodiment by a machine component that renders the logic elements in a form that instructs a digital processing apparatus (that is, a computer) to perform a sequence of function steps corresponding to those shown. In other words, the registration module 76 and continuous authentication module 92 may be a computer program that is executed by a processor within the authentication computer 40 as a series of computer-executable instructions.

Figure 7:
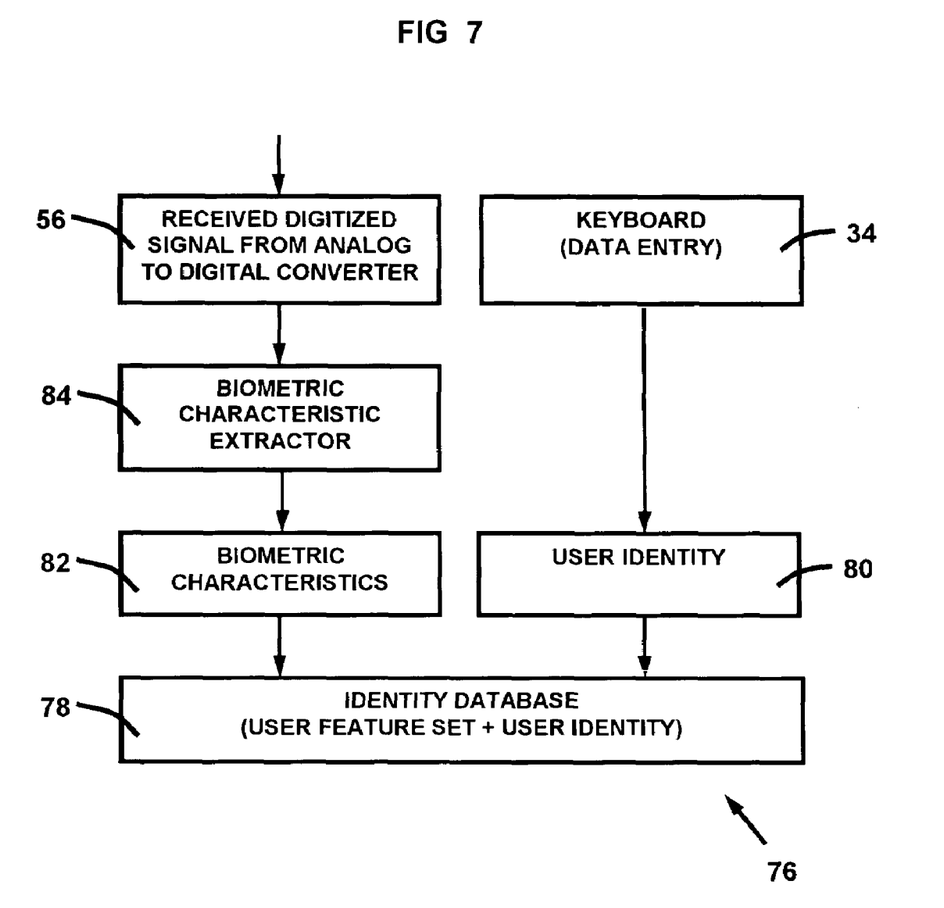
FIG. 7 is a schematic view of an algorithm, showing the logic of the registration module diagram.
Figure 8:
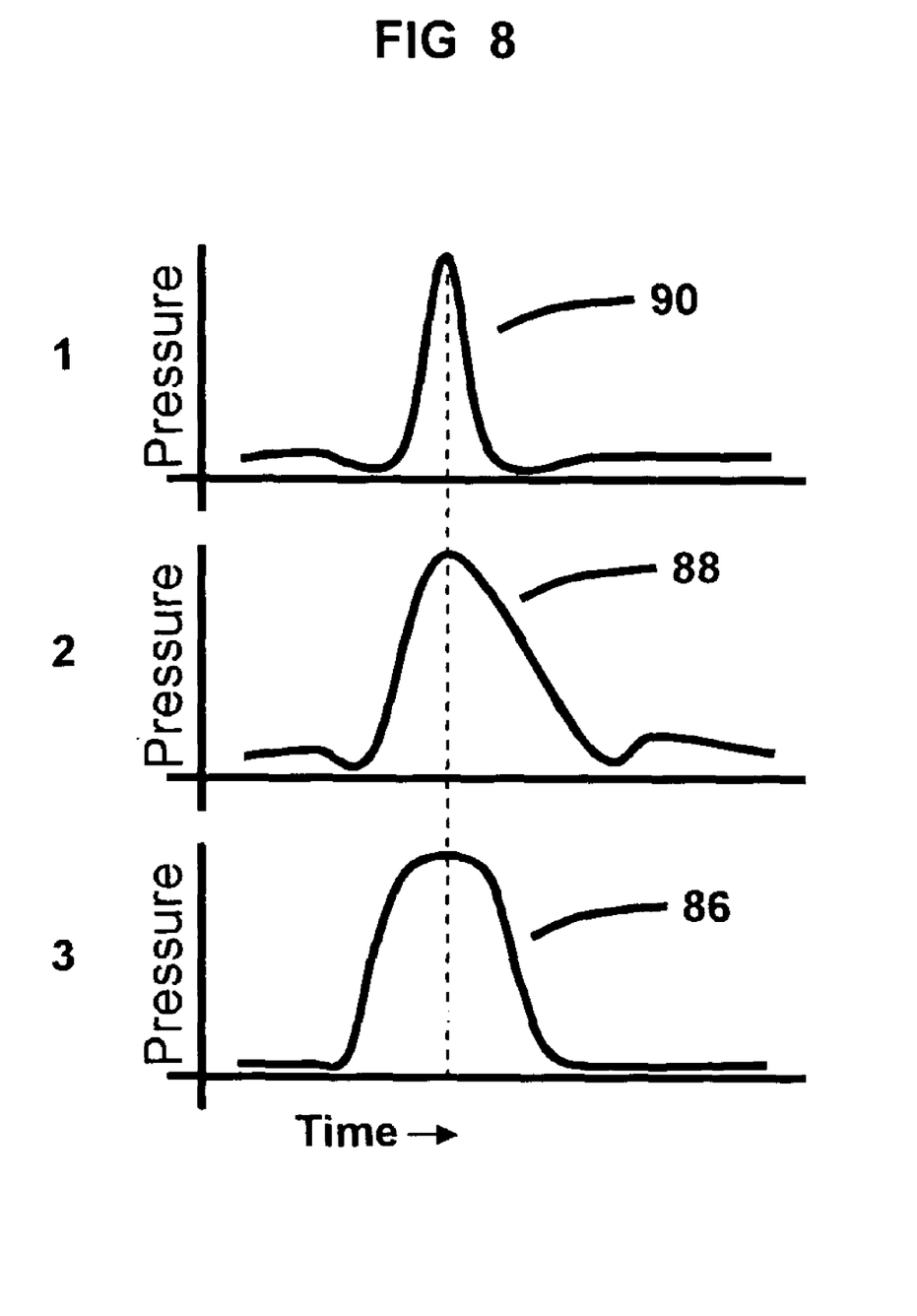
FIG. 8 is a graphic view of a pressure wave signal from a single pressure sensor of three different users before digitization of the pressure wave signal.

FIG. 7 shows the logic of the preferred embodiment of the registration module 76. The registration module 76 links the user identity 80 to the user's biometric characteristics 82. Logic components shown in FIG. 7 can be embodied as software, hardware or a combination of both. An authorized registrant uses the keyboard 34 to enter the user identity 80 to be linked to the biometric characteristics 82 of the user. The digitized signal 56 from the analog to digital converter 58 from the plurality of sensors provide input to a biometric characteristics extractor 84. The biometric characteristics extractor 84 can use various methods to extract biometric characteristics 82 including, but is not limited to the following list: descriptive statistics, canonical correlation, Fourier analysis, wavelet analysis, fuzzy sets classification and neural networks classification. The biometric characteristics extractor 84 generates a set of biometric characteristics 82 from each of the sensors that are then linked to the user identity 80 in the identity database 78 to the user. As an example, FIG. 8 shows the pressure wave signal 68 from a single pressure sensor of three different users before digitization of the pressure wave signal 68. As the user applies pressure the signal increases, but each user's signal has different descriptive statistical characteristics. Characteristics of the first user 90 includes symmetry and narrowness of the pressure signal around the peak of the pressure wave. Characteristics of the second user 88 includes asymmetry and increased pressure signal duration. Characteristics of the third user 86 includes symmetry and an increased duration of high pressure.

Figure 9:
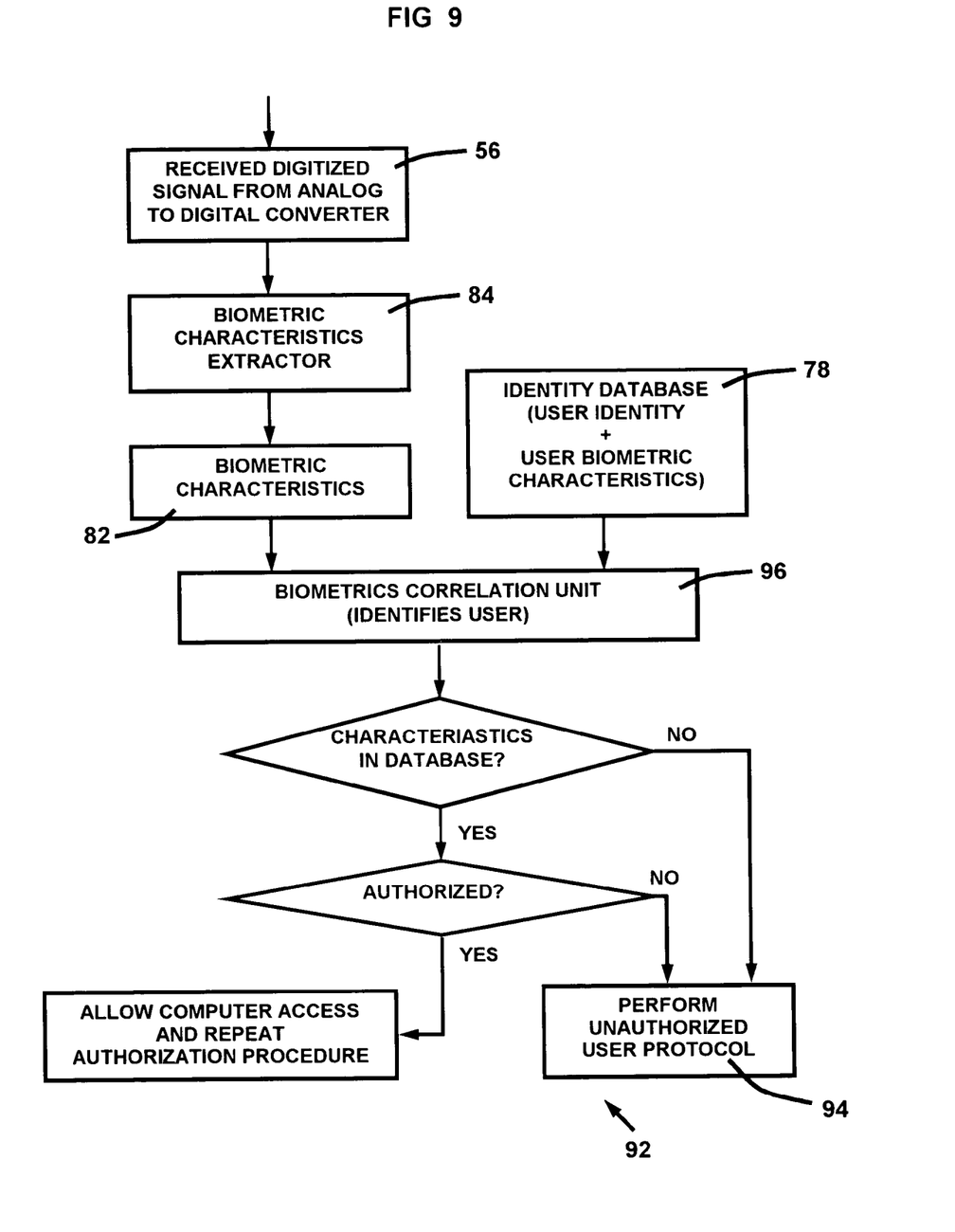
FIG. 9 is a schematic diagram view of an algorithm, showing the logic of the continuous authentication module.

FIG. 9 shows logic of the continuous authentication module 92 of the preferred embodiment of the device when used during the continuous authentication of the user. The continuous authentication module 92 verifies that the user's biometric characteristics 82 are in the identity database 78, that the user is an authorized user and is allowed to have continued task computer 44 access. Logic components shown in FIG. 9 can be embodied as software, hardware or a combination of both. The digitized signal 56 from the analog to digital converter 58 from the plurality of sensors provide input to a biometric characteristics extractor 84. The biometric characteristics 82 extracted from the digitized signals are correlated to those biometric characteristics 82 in the identity database 78. The biometric characteristics 82 correlation unit can use the following list of models to compare the biometric characteristics 82, but is not limited to the following list: discriminant analysis, multidimensional scaling, factor analysis, neural networks, and support vector machine analysis.

Discriminant analysis has been shown to be on average 79% accurate with a single signal input when discriminating between six persons as shown in Ikehara, C. and Crosby, M. E., "User Identification Based on the Analysis of the Forces Applied by a User to a Computer Mouse 12," Proceedings of the Hawaii International Conference on System 14 Sciences, Kona, Hi., 2003. Increased accuracy can be obtained from multiple sensors and sequential inputs (e.g., potentially greater than 95% accurate after 3 sequential signal inputs).

The output from the biometrics correlation unit 96 will indicate whether the user is or is not in the identity database 78 and if the user is in the identity database 78, the biometrics correlation unit 96 will provide the user's identity. An authorized user will have continued access to the task computer 44 and the authorization procedure will repeat. When the biometrics correlation module cannot identify the user or when the user is not found on the authorized user list, the computer will perform an unauthorized user protocol 94. The unauthorized user protocol 94 may include blocking access to the task computer 44 by sending a signal via the authentication to task computer cable 42.

Computer systems protected by the invention would have a limited number of registered users (e.g., usually one to three users). Initial access would not be accomplished by comparing the user's biometrics to a large database of users (i.e., a one-to-many comparison), but by conventional high accuracy identification means such as a password. After initial access is obtained, continuous authentication of the user's identity would be performed by comparing the user's identity at initial access to the registered biometrics of that user (i.e., a one-to-one comparison). In many cases, a one-to-one comparison is faster and more accurate than a one-to-many comparison. A more detailed discussion of the differences and appropriateness of the one-to-one versus one-to-many comparison methods can be found in Nanavati, S., Thieme, M. and Navanati, R., "Biometrics: Identity Verification in a Networked World", 2002, pp. 12-14.

While the particular INPUT DEVICE TO DETECT BIOMETRICS as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art. For example, continuous user authentication from a biometric characteristics 82 can be obtained from pressure sensors mounted within a joystick, steering wheel, trackball, or foot pedal. The scope of the present invention accordingly is to be limited by nothing other than the appended claims, in which reference to an element in the singular means "at least one" unless otherwise recited.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

We claim:

1. An input device to continuously detect biometrics for facilitating continuous authentication of the user's identification based on input from sensors attached to the device comprising:

means for providing a base with sensors that indicate different pressures applied to the base by a user;

means for conditioning the analog signal so that it can be converted into a digital signal, electrically connected to said means for providing a base with sensors that indicate different pressures applied to the base by a user;

means for receiving and analyzing data from the sensor electronics for registration and continuous authentication, electrically connected to said means for conditioning the analog signal so that it can be converted into a digital signal;

means for initially linking the user's identity to the user's biometric characteristics, totally embedded to said means for receiving and analyzing data from the sensor electronics for registration and continuous authentication;

means for extracting a set of biometric characteristics from the digitized signal;

means for linking the user identity to the user's biometric characteristics in the database;

means for continuously verifying that the identity of a user is authorized, algorithmically connected to said means for initially linking the user's identity to the user's biometric characteristics, and totally embedded to said means for receiving and analyzing data from the sensor electronics for registration and continuous authentication;

means for matching a new set of biometric characteristics with the biometric characteristics in the identity database; and means for changing the user's computer access.

2. The input device to continuously detect biometrics in accordance with claim 1, wherein said means for providing a base with sensors that indicate different pressures applied to the base by a user comprises a computer mouse.

3. The input device to continuously detect biometrics in accordance with claim 1, wherein said means for conditioning the analog signal so that it can be converted into a digital signal comprises an electrical sensor electronics module.

4. The input device to continuously detect biometrics in accordance with claim 1, wherein said means for receiving and analyzing data from the sensor electronics for registration and continuous authentication comprises an authentication computer.

5. The input device to continuously detect biometrics in accordance with claim 1, wherein said means for initially linking the user's identity to the user's biometric characteristics comprises a registration module.

6. The input device to continuously detect biometrics in accordance with claim 1, wherein said means for extracting a set of biometric characteristics from the digitized signal comprises a biometric characteristics extractor.

7. The input device to continuously detect biometrics in accordance with claim 1, wherein said means for linking the user identity to the user's biometric characteristics in the database comprises a software identity database.

8. The input device to continuously detect biometrics in accordance with claim 1, wherein said means for continuously verifying that the identity of a user is authorized comprises a continuous authentication module.

9. The input device to continuously detect biometrics in accordance with claim 1, wherein said means for matching a new set of biometric characteristics with the biometric characteristics in the identity database comprises a biometrics correlation unit.

10. The input device to continuously detect biometrics in accordance with claim 1, wherein said means for changing the user's computer access comprises an unauthorized user protocol.

11. An input device to continuously detect biometrics for facilitating continuous authentication of the user's identification based on input from sensors attached to the device comprising:

a computer mouse, for providing a base with sensors that indicate different pressures applied to the base by a user;

an electrical sensor electronics module, for conditioning the analog signal so that it can be converted into a digital signal, electrically connected to said computer mouse;

an authentication computer, for receiving and analyzing data from the sensor electronics for registration and continuous authentication, electrically connected to said sensor electronics module;

a registration module, for initially linking the user's identity to the user's biometric characteristics, totally embedded to said authentication computer;

a biometric characteristics extractor, for extracting a set of biometric characteristics from the digitized signal;

a software identity database, for linking the user identity to the user's biometric characteristics in the database;

a continuous authentication module, for continuously verifying that the identity of a user is authorized, algorithmically connected to said registration module, and totally embedded to said authentication computer;

a biometrics correlation unit, for matching a new set of biometric characteristics with the biometric characteristics in the identity database; and an unauthorized user protocol, for changing the user's computer access.

12. The input device to continuously detect biometrics as recited in claim 11, further comprising:

a task computer, for providing the computer user access to a task, electrically connected to said authentication computer.

13. An input device to continuously detect biometrics for facilitating continuous authentication of the user's identification based on input from sensors attached to the device comprising:

a computer mouse, for providing a base with sensors that indicate different pressures applied to the base by a user;

an electrical sensor electronics module, for conditioning the analog signal so that it can be converted into a digital signal, electrically connected to said computer mouse;

an authentication computer, for receiving and analyzing data from the sensor electronics for registration and continuous authentication, electrically connected to said sensor electronics module;

a task computer, for providing the computer user access to a task, electrically connected to said authentication computer;

a software, hardware registration module, for initially linking the user's identity to the user's biometric characteristics, totally embedded to said authentication computer;

a hardware, software biometric characteristics extractor, for extracting a set of biometric characteristics from the digitized signal;

a software identity database, for linking the user identity to the user's biometric characteristics in the database;

a software, hardware continuous authentication module, for continuously verifying that the identity of a user is authorized, algorithmically connected to said registration module, and totally embedded to said authentication computer;

a software, hardware biometrics correlation unit, for matching a new set of biometric characteristics with the biometric characteristics in the identity database; and a software, hardware unauthorized user protocol, for changing the user's computer access.

* * * * *